United States Patent [19]

Hermesmeyer

[11] 4,216,542
[45] Aug. 5, 1980

[54] METHOD AND APPARATUS FOR QUADRIPHASE-SHIFT-KEY AND LINEAR PHASE MODULATION

[76] Inventor: Robert A. Frosch, Administrator of the National Aeronautics and Space Administration, with respect to an invention of Charles E. Hermesmeyer, Scottsdale, Ariz.

[21] Appl. No.: 17,890

[22] Filed: Mar. 6, 1979

[51] Int. Cl.² .......................................... H04L 27/18
[52] U.S. Cl. .................................... 375/67; 375/54; 455/102; 332/22; 332/23 R
[58] Field of Search ............................. 178/66 R, 67; 179/15 BM, 15 BC; 325/39, 40, 45, 59, 139, 145, 163, 164, 30; 332/16, 17, 22, 23

[56] References Cited

U.S. PATENT DOCUMENTS

| | | | |
|---|---|---|---|
| 2,407,887 | 9/1946 | Labin | 325/163 |
| 3,289,082 | 11/1966 | Shumate | 178/66 R |
| 3,349,181 | 10/1967 | Ito | 179/15 |
| 3,378,773 | 4/1968 | Jeffers | 325/139 |
| 3,714,573 | 1/1973 | Grossman | 325/32 |
| 3,766,477 | 10/1973 | Cook | 325/30 |
| 3,845,412 | 10/1974 | Rearwin | 332/9 R |
| 3,868,599 | 2/1975 | Hirasaki et al. | 332/17 |
| 3,916,313 | 10/1975 | Lowry | 325/30 |
| 3,924,186 | 12/1975 | Gordy et al. | 325/30 |
| 3,971,999 | 7/1976 | Bilsens et al. | 329/105 |
| 3,973,201 | 8/1976 | Andren | 325/163 |
| 3,987,374 | 10/1976 | Jones, Jr. | 179/15 BM |
| 4,006,418 | 2/1977 | Liskov | 325/163 |

*Primary Examiner*—Benedict V. Safourek
*Attorney, Agent, or Firm*—Monte F. Mott; John R. Manning; Paul F. McCaul

[57] ABSTRACT

A submultiple (30Fl) of an S-band transmitter output frequency (240Fl) is divided equally between a linear phase modulation branch and a QPSK modulation branch. The linear modulation branch includes a multiplier (X7) to increase the carrier frequency to a level (210Fl) which, when combined with the carrier in the QPSK branch in an up-converter (utilizing a mixer at the input thereof followed by a bandpass filter), produces the transmitter output frequency. This allows the QPSK modulator to operate at one-eight of the output frequency where repeatable and precisely controlled modulation can be easily achieved. This also allows linear phase modulation at one-eighth the output frequency where low modulator deviation and good linearity can be easily maintained.

5 Claims, 2 Drawing Figures

METHOD AND APPARATUS FOR QUADRIPHASE-SHIFT-KEY AND LINEAR PHASE MODULATION

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 USC 2457).

BACKGROUND OF THE INVENTION

This invention relates to a modulator for the S-band frequency of a transmitter capable of providing both linear phase modulation and quadriphase shift key (QPSK) modulation.

In a tracking and data relay satellite system (TDRSS), a user transponder included a staggered QPSK modulation as well as a linear phase modulation capability, with close tolerances on the amplitude and phase relationships of the four phase states of the QPSK modulator output and on the linearity of the linear phase modulator. The desired precision required that a carrier-phase-switching type of QPSK modulator be used, rather than any form of linear modulation. Furthermore switching between 0° and 180° was greatly preferred for the same reason over switching smaller steps with subsequent multiplication.

In the past, these requirements have been met by a QPSK modulator at the S-band transmitter output frequency and in series with a linear modulator. However, better reproducibility and more freedom from parasitic capacitance and inductance effects could be obtained from operating the QPSK modulator at a lower frequency while maintaining operation of the linear modulation at a higher frequency, typically one-eighth the transmitter S-band output frequency. The present invention makes possible the arrangement of QPSK and linear phase modulation with these desired characteristics and performance.

SUMMARY OF THE INVENTION

In accordance with the present invention, a quadriphase shift keying (QPSK) modulator and a linear modulator are provided in separate branches of a transmitter modulator and combined at their output by an up-converter in order to allow QPSK modulation at a fraction (typically one-eighth) of the transmitter frequency. The linear phase modulator operates at the lower frequency of the QPSK with a multiplier following the linear phase modulator to increase the output of the linear phase modulator to a frequency necessary as an input to the up-converter to produce the same signal. When the linear modulator is being used, the QPSK modulator can be used with a PN code to spread the linear phase modulator, but in either case the up-converter produces the same signal as if the QPSK modulator had been placed in series with the linear modulator, but because it is a separate branch operating at a fraction of the transmitter frequency, repeatable and precisely controlled QPSK modulator characteristics can be easily attained, while in the linear modulator, a significant amount of multiplication follows to maintain low modulation deviation and good linearity.

The novel features of the invention are set forth with particularity in the appended claims. The invention will best be understood from the following description when read in conjunction with the accompanying drawings.

DESCRIPTION OF PREFERRED EMBODIMENTS

Figure 1:
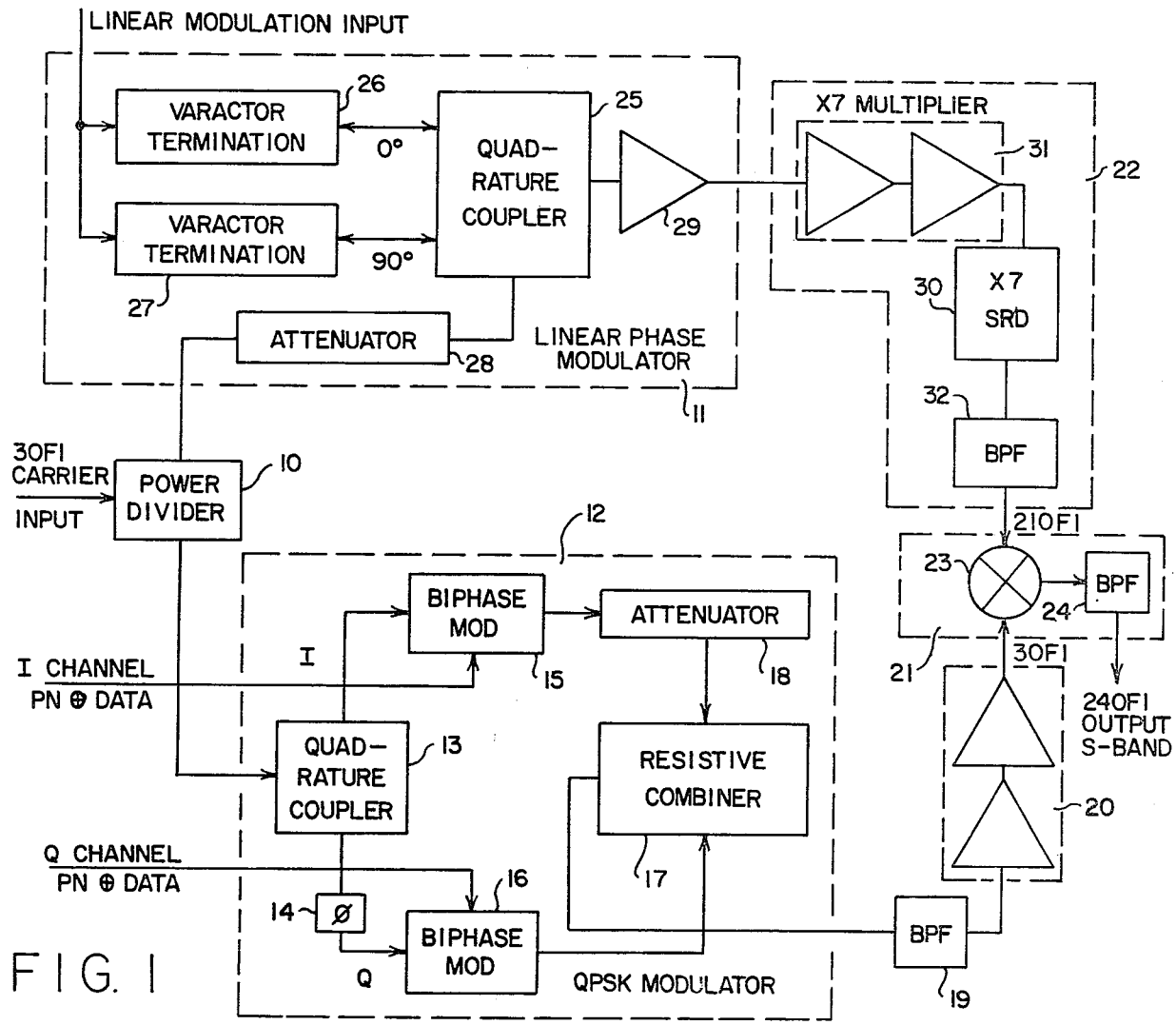
FIG. 1 is a functional block diagram illustrating the arrangement of a linear modulator and a quadriphase shift key modulator in accordance with the present invention.

In the block diagram of FIG. 1, the r-f carrier frequencies are referenced in terms of multiples of a basic frequency F1 selected for a transmitter output frequency 240F1 in the S-band. For the transmitter frequency range of 2200 to 2300 MHz, the carrier input 30F1 from an exciter (not shown) ranges from 275 to 287.5 MHz, and 210F1 ranges from 1955 to 2042.5 MHz. Quadriphase shift keying (QPSK) modulation and linear phase modulation are provided in two separate branches, both furnished with the 30F1 carrier by a power divider 10 which splits the carrier from the exciter. One branch is comprised of a linear phase modulator 11 and the other branch is comprised of QPSK modulator 12.

The QPSK modulator uses a quadrature hybrid coupler 13 to separate the carrier into equal in-phase (I) and quadrature (Q) components. Attenuator pads (6dB) included at each output of the coupler isolate the following circuits from the coupler to ensure stable amplitude and 90° phase relationship. A phase adjuster 14 in the Q channel permits precise setting of 90° phase difference.

The I and Q channels include respective biphase modulators 15 and 16. Each may be comprised of a double balanced mixer using two pairs of diodes. A binary data signal stream, either module-2 added to a pseudorandom noise (PN) code, or alone, depending on the transmitter mode, is applied at the dc coupled port of each mixer. This modulating signal alternately switches the mixer diodes from hard forward conduction to reverse biased cut-off and thus produces a biphase modulated signal output from each bi-phase modulator.

The modulated signals from the bi-phase modulators are then combined without further differential phase shift in a resistive combiner 17 to produce the QPSK modulated 30F1 carrier signal. A selectable attenuator 18 in the I channel allows setting the power ratio Q/I of the two channels as required for the particular application, typically anywhere from 1:1 to 4:1.

It should be noted that when the PN code is used on both channels, the I and Q channel PN codes may be offset from each other by half a chip (half a code bit period). The result is staggered QPSK modulation. It is for that purpose that the I and Q channel inputs (PN⊕DATA) are separate. However, staggered QPSK modulation of the PN code is not a requirement of this invention.

A bandpass filter 19 at the output of the combiner 17 passes the main lobe of the modulated signal spectrum, but attenuates modulation sidelobes to reduce the possibility of creating inter-channel interference at the transmitter output. A preamplifier 20 couples the bandpass filter 19 to an up-converter 21 where only up-conversion to the S-band transmitter output frequency (240F1)

takes place, and not multiplication. The QPSK modulation characteristics thus remain unaltered as the QPSK modulated carrier (30F1) is combined with the carrier increased to 210F1 by a multiplier 22 in the linear phase modulator branch. The up-converter uses a balanced mixer 23 to combine the 30F1 QPSK modulated signal and the 210F1 signal to produce the 240F1 S-band output signal. A bandpass filter 24 selects the desired 240F1 signal component at the output of the mixer 23 and suppresses the other frequency components generated by the mixer.

Figure 2:
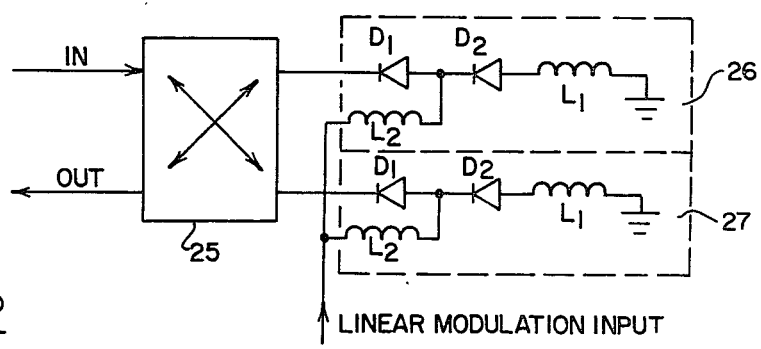
FIG. 2 is a schematic diagram illustrating the typical arrangement for the linear phase modulator of FIG. 1.

The linear phase modulator 11 uses a quadrature coupler with variable reactive terminations (voltage-variable capacitor diodes) 26 and 27 to phase modulate a linear modulation input onto the carrier (30F1) supplied by the power divider 10 through an attenuator 28. FIG. 2 illustrates schematically such an arrangement utilizing a 3-dB quadrature coupler 25, sometimes called a directional hybrid junction. The coupler divides the power into one port from the attenuator 28 (FIG. 1) equally between the opposite two ports, and supplies no power directly to the output port. This operation is performed with phase quadrature between the two opposite ports. Voltage-variable capacitor diodes $D_1$ and $D_2$ in each of the variable reactive terminations 26 and 27 cooperate with inductances $L_1$ and $L_2$ in each of the variable reactive terminations to cause power to be phase shifted and reflected to the output port. The degree of phase shift is controlled by the linear modulation input voltage applied to the diodes.

An impedance matching amplifier 29 couples the output of the quadrature coupler 25 to the multiplier 22. The latter may be comprised of X7 step-recovery diode (SRD) multiplier 30 coupled by a preamplifier 31 to the linear phase modulator. A bandpass filter selects the 210F1 component at the output of the SRD and passes it on to the balanced mixer 23 in the up-converter. The 210F1 filtered output of the linear phase modulator thus provides the frequency signal necessary for the up-converter.

It should be noted that although the linear phase modulation branch must introduce a multiplication of seven, the multiplication occurs in the signal path following the linear phase modulator. Consequently, the linear phase modulator needs to produce an index of only one-seventh the index required at the transmitter output. This facilitates maintaining linearity over the required phase deviation range. This is an important feature of the invention in that it allows maintaining low modulator deviation and good linearity, while the up-conversion scheme allows the QPSK modulator to operate at one eighth of the S-band transmitter output frequency where repeatable and precisely controlled modulator characteristics can be easily attained.

Although in the usual application, only one modulator is used at any one time, it may be desirable to sometimes use both, such as to spread the linear phase modulated signal transmitted with a PN code. The up-conversion arrangement then produces the same signal as if a QPSK modulator had been placed in series with the linear phase modulator at the S-band output frequency. The advantage of this arrangement is, as just noted above, that the QPSK modulator operates at a fraction (one-eighth in the exemplary embodiment) of the S-band transmitter output frequency. The measured performance of the QPSK modulator is well within 3° and 0.5 dB I/Q orthogonality and amplitude tolerances over the modulation frequency range of 100 bps to 6 Mbps.

The linear modulator performs within 2% non-linearity with an S-band deviation of up to ±1.0 radian (5% to ±2.0 radians) over the modulation frequency range of 1 Kbps to 3 Mbps.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A method for QPSK modulation and linear phase modulation of an input carrier signal at a submultiple of the frequency of an output signal to be transmitted for repeatable and precisely controlled QPSK modulation, and for low modulator deviation and good linearity of the linear phase modulation, comprising the steps of dividing the input carrier signal into two branches, performing QPSK modulation in one branch as required and bandpass filtering the QPSK modulated signal for the frequency of said input carrier signal, performing linear phase modulation in the other branch as required, multiplying the output of the linear phase modulation by a factor equal to one less than required to convert the input carrier signal frequency to said output frequency and bandpass filtering the product for the frequency of said input carrier signal times said factor, combining in a balanced mixer the output signal of the QPSK modulator with the signal produced by said multiplying step to produce the frequency of said output signal, and bandpass filtering the output of said mixer for the frequency of said output signal, where said QPSK modulation, linear modulation, or QPSK and linear modulation is selectively utilized.

2. Apparatus for selective QPSK or linear modulation, or both QPSK and linear modulation, of a carrier input signal comprising means for dividing said carrier input signal into two branches, means for biphase modulating said carrier signal in one of said branches when a QPSK modulation input is present, thereby to provide as QPSK an output of one of said branches a signal at the frequency of said carrier with biphase modulation as required by said QPSK modulation input, means for linear-phase modulating said carrier signal in the other of said branches when a linear modulation input is present, thereby to provide as an output of said linear-phase modulating means a signal at the frequency of said carrier with linear phase modulation as required by said linear modulation input, means for multiplying the output of said linear phase modulator by an integer to provide as an output of the other of said branches a signal at some predetermined multiple of said carrier with linear phase modulation, and means for combining the output of said two branches to provide as an output signal for transmission a signal at a frequency equal to the sum of the output signals of said two branches with QPSK modulation or linear phase modulation, or both QPSK modulation and linear phase modulation.

3. Apparatus as defined in claim 2 wherein said combining means is an up-converter comprised of a balanced mixer followed by a bandpass filter.

4. In a system for selective QPSK modulation and linear phase modulation of a carrier that is a submultiple of an S-band transmitter output frequency, the combination of two parallel modulation branches, a first branch for QPSK modulation, said first branch including a QPSK modulator and a bandpass filter for said submultiple at the output of said QPSK modulator, and a second branch for linear phase modulation, said second branch including a linear phase modulator, a multiplier for multiplying said submultiple by a factor which is one less than required to increase said carrier to said output frequency, and a bandpass filter for said multiplied subcarrier, means for dividing available input carrier power between said two branches, and means connected to said bandpass filters of said two branches for combining the output signals of said two bandpass filters into a signal for transmission at a frequency that is the sum of the frequencies of the output signals of said two bandpass filters.

5. The combination of claim 4 wherein said combining means is comprised of a balanced mixer and a bandpass filter for selecting the desired signal component and suppressing the other frequency components generated by said mixer.

* * * * *